United States Patent
Mayville et al.

(10) Patent No.: US 11,708,104 B2
(45) Date of Patent: *Jul. 25, 2023

(54) STEERING WHEEL MOUNTED DISPLAY ASSEMBLY RETAINING UPRIGHT ORIENTATION REGARDLESS OF ROTATED POSITION

(71) Applicant: Kuster North America, Inc., Troy, MI (US)

(72) Inventors: Brian Andrew Mayville, Northville, MI (US); Calogero Alu, Shelby Charter Township, MI (US); Christopher Soave, Oxford, MI (US); Thorsten Dirk Connemann, Ehringshausen (DE)

(73) Assignee: KUSTER NORTH AMERICA, INC., Troy, MI (US)

( * ) Notice: Subject to any disclaimer, the term of this patent is extended or adjusted under 35 U.S.C. 154(b) by 50 days.

This patent is subject to a terminal disclaimer.

(21) Appl. No.: 17/475,494

(22) Filed: Sep. 15, 2021

(65) Prior Publication Data

US 2022/0001912 A1 Jan. 6, 2022

Related U.S. Application Data

(63) Continuation-in-part of application No. 17/180,920, filed on Feb. 22, 2021, and a continuation-in-part of application No. 17/178,881, filed on Feb. 18, 2021.

(Continued)

(51) Int. Cl.
*B60K 35/00* (2006.01)
*B62D 1/04* (2006.01)

(52) U.S. Cl.
CPC ............. *B62D 1/046* (2013.01); *B60K 35/00* (2013.01); *B60K 2370/782* (2019.05)

(58) Field of Classification Search
CPC .... B62D 1/046; B62D 15/024; B62D 15/022; B62D 15/0215; B62D 15/021;
(Continued)

(56) References Cited

U.S. PATENT DOCUMENTS 4,541,301 A * 9/1985 Ono ....................... B62D 1/105
200/61.54
4,604,912 A * 8/1986 Sugita ................... B60R 16/027
200/61.54
(Continued)

FOREIGN PATENT DOCUMENTS

CN 110466607 A * 11/2019
CN 111469920 A * 7/2020
(Continued)

*Primary Examiner* — T. Scott Fix
(74) *Attorney, Agent, or Firm* — Dinsmore & Shohl LLP

(57) ABSTRACT

A steering wheel mounted visual display including a housing incorporated at a location defined within a circumference of the steering wheel and having a graphical display output. Upon rotation of the steering wheel, the display adjusts to remain in an upright orientation. The housing further includes a main lower housing and an assemble-able upper housing sandwiching a display component providing the graphical display output. The display component further includes a stationary inner component, a display support and a PCB component cooperating for auto-updating the graphical display output in response to rotation of the steering wheel.

2 Claims, 13 Drawing Sheets

Related U.S. Application Data

(60) Provisional application No. 63/079,620, filed on Sep. 17, 2020, provisional application No. 62/979,794, filed on Feb. 21, 2020, provisional application No. 62/978,400, filed on Feb. 19, 2020.

(58) Field of Classification Search
CPC .... B62D 15/0205; B62D 15/02; B60K 35/00; B60K 2370/782
USPC .............. 74/552; 116/31; 340/438, 465, 672
See application file for complete search history.

(56) References Cited

U.S. PATENT DOCUMENTS

| | | | | |
|---|---|---|---|---|
| 5,072,628 | A | * | 12/1991 | Oki .................. B62D 1/105 74/484 R |
| 5,610,577 | A | * | 3/1997 | Hwang ................ G01D 5/04 340/672 |
| 5,691,695 | A | * | 11/1997 | Lahiff ................. B60Q 3/14 340/459 |
| 5,855,144 | A | * | 1/1999 | Parada ............... B60K 37/06 200/61.57 |
| 8,406,961 | B2 | | 3/2013 | Pathak et al. |
| 10,370,021 | B2 | * | 8/2019 | Gong ................. B62D 1/046 |
| 10,780,909 | B2 | | 9/2020 | Aerts et al. |
| 2002/0085043 | A1 | * | 7/2002 | Ribak ................ B60W 50/14 715/810 |
| 2006/0146074 | A1 | * | 7/2006 | Harrison ............. B60K 35/00 345/660 |
| 2006/0213315 | A1 | * | 9/2006 | Faeth ................. B62D 1/105 74/552 |
| 2008/0023309 | A1 | * | 1/2008 | Montalvo ........... H01H 9/181 200/332 |
| 2009/0189373 | A1 | * | 7/2009 | Schramm ......... B60R 11/0264 280/731 |
| 2009/0223321 | A1 | | 9/2009 | Stefani |
| 2014/0062891 | A1 | * | 3/2014 | Powell ............... B60K 37/06 345/173 |
| 2015/0066245 | A1 | | 3/2015 | Lee et al. |
| 2016/0375770 | A1 | * | 12/2016 | Ryne ................... B62D 1/10 701/23 |
| 2018/0143754 | A1 | * | 5/2018 | Niazi ................. B60K 37/06 |
| 2018/0231976 | A1 | | 8/2018 | Singh |
| 2019/0212910 | A1 | | 7/2019 | Abt et al. |

FOREIGN PATENT DOCUMENTS

| | | | | |
|---|---|---|---|---|
| DE | 19739626 | A1 * | 6/1998 | .......... B60Q 1/0082 |
| DE | 102012014326 | A1 * | 1/2014 | ............ B60K 35/00 |
| DE | 102016007024 | A1 * | 12/2017 | ............ B60K 35/00 |
| DE | 102018009557 | A1 * | 6/2020 | |
| DE | 102019006754 | A1 * | 4/2021 | |
| EP | 1323617 | A1 * | 7/2003 | ........ B60R 21/2032 |
| WO | WO-0160650 | A1 * | 8/2001 | ............ B60K 35/00 |
| WO | WO-2005085016 | A1 * | 9/2005 | ........ B60R 21/2032 |
| WO | WO-2005123481 | A1 * | 12/2005 | ............ B60K 31/18 |

* cited by examiner

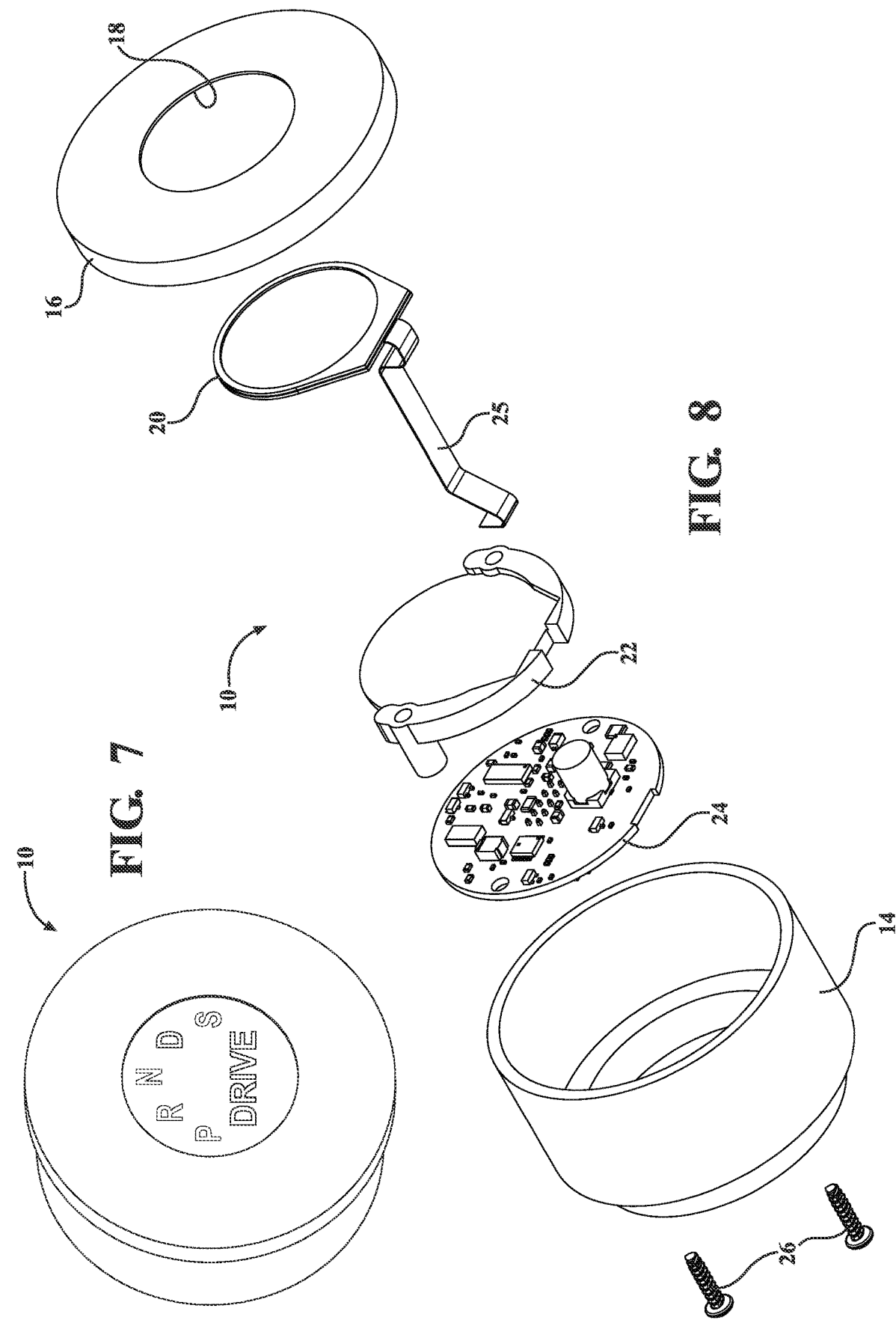

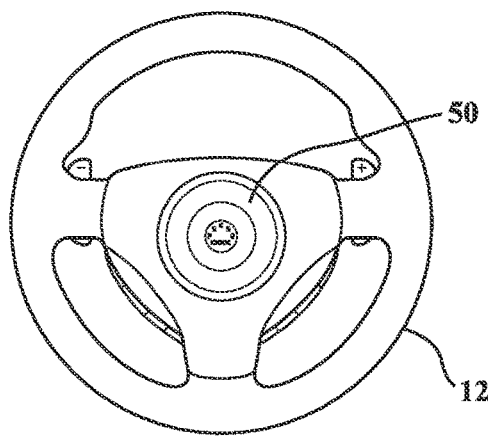
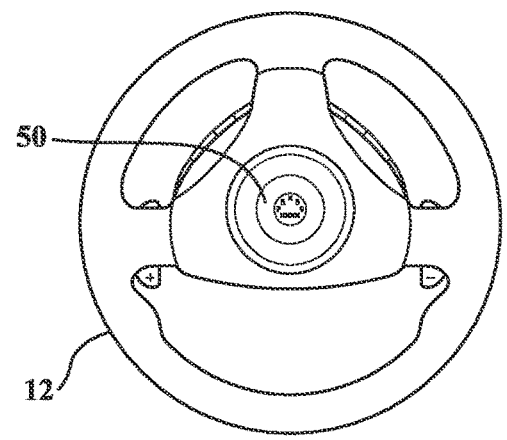
FIG. 9    FIG. 10
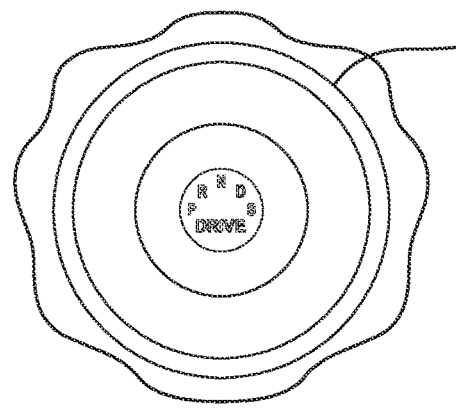
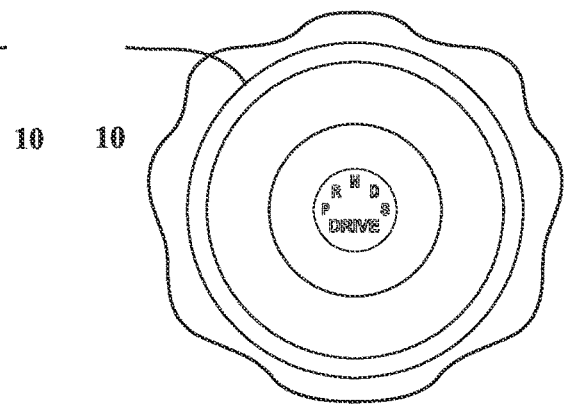
FIG. 9A    FIG. 10A
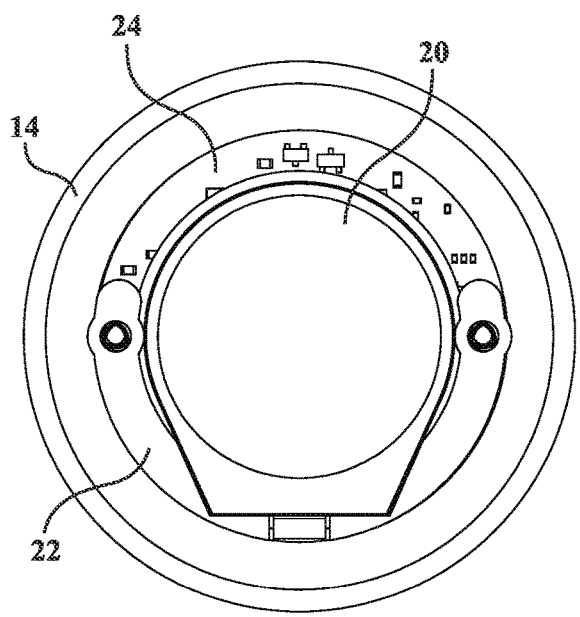
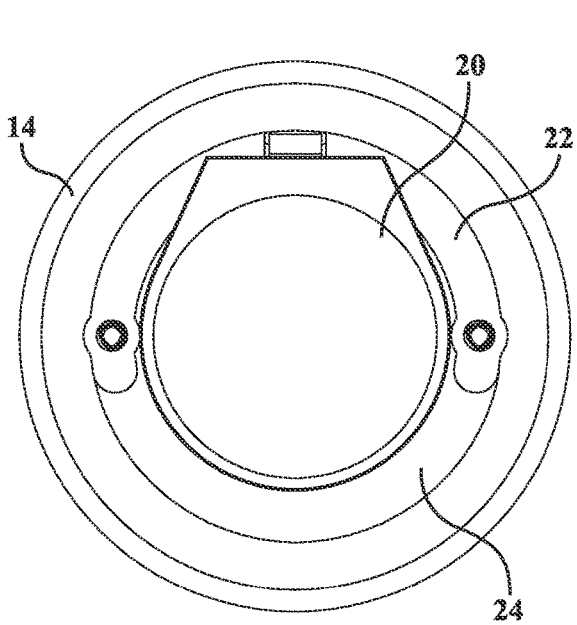
FIG. 11    FIG. 12

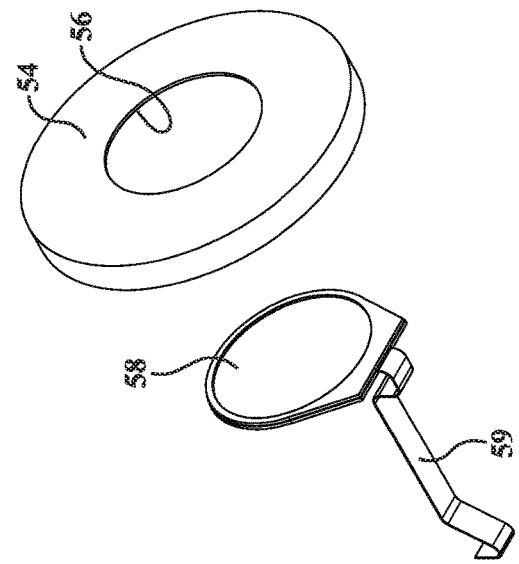
FIG. 13
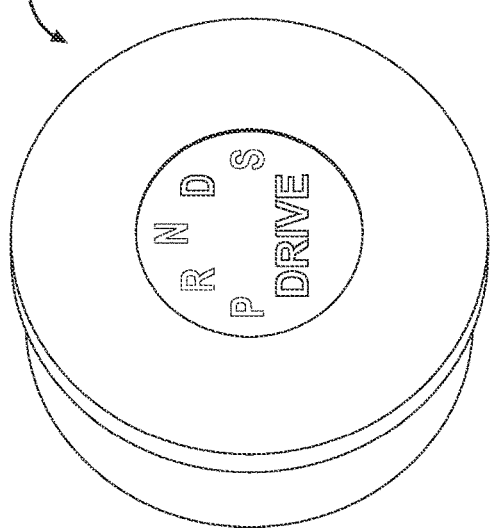
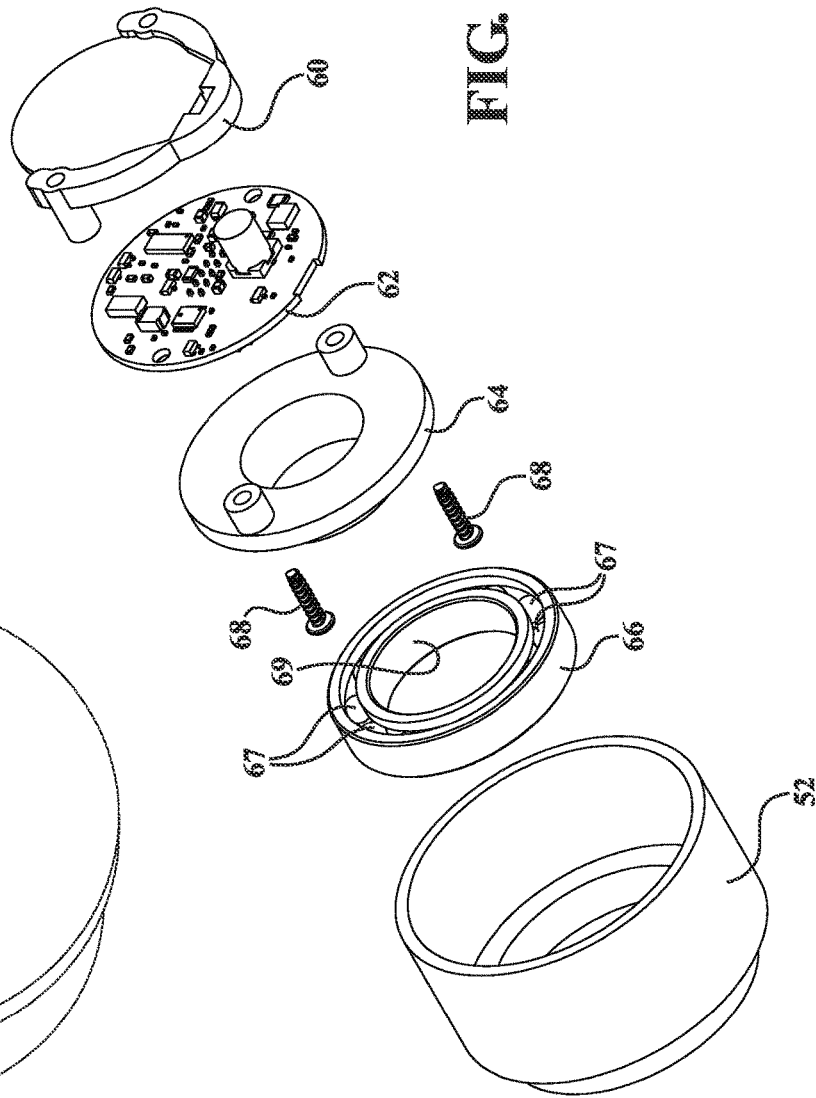
FIG. 14

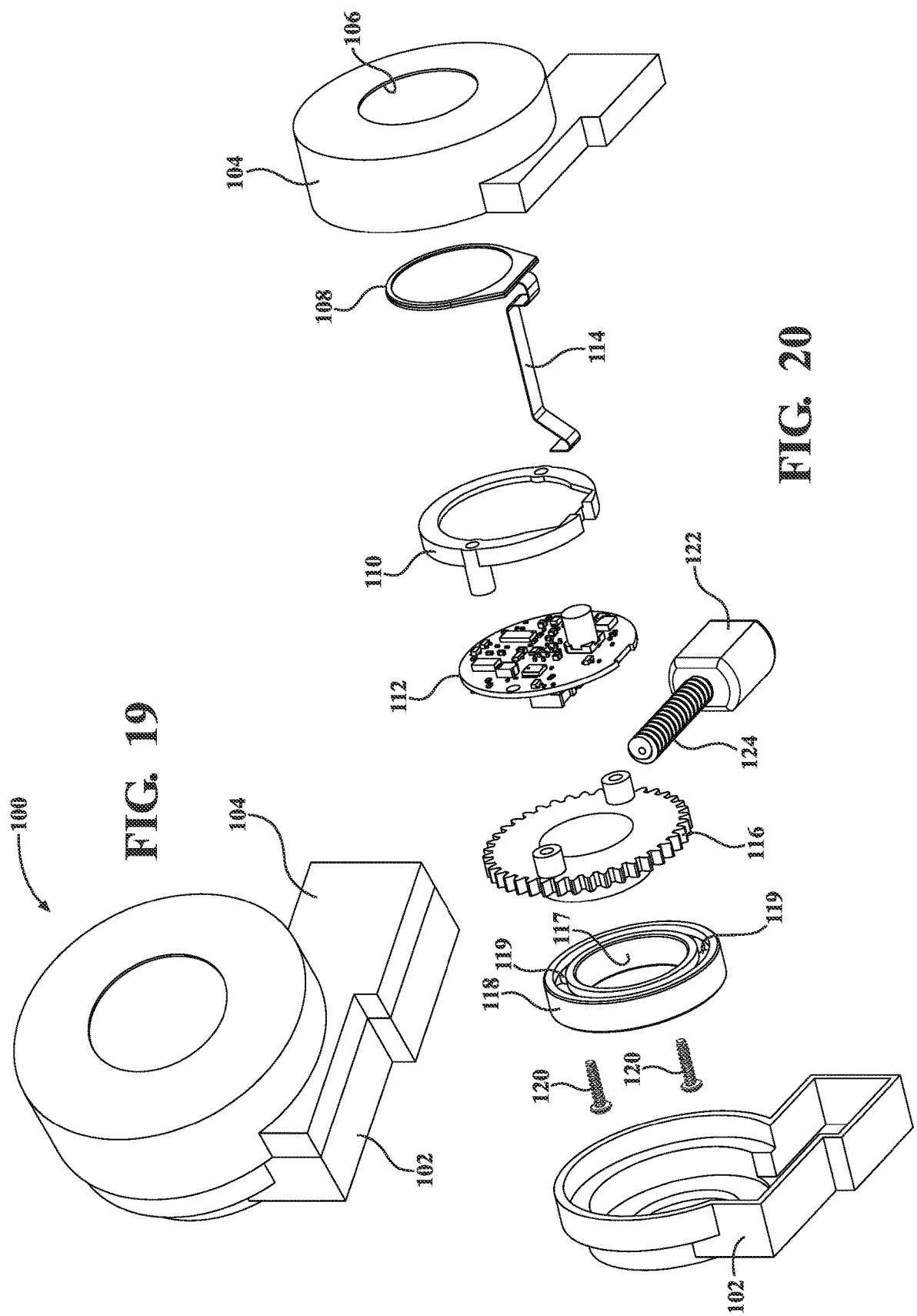

STEERING WHEEL MOUNTED DISPLAY ASSEMBLY RETAINING UPRIGHT ORIENTATION REGARDLESS OF ROTATED POSITION

CROSS REFERENCE TO RELATED APPLICATIONS

This Application is a Continuation-in-part of application Ser. No. 17/180,920 filed on Feb. 22, 2021. Application Ser. No. 17/180,920 claims the benefit of U.S. Provisional Application 62/979,794 filed on Feb. 21, 2020. This Application is a Continuation-in-part of application Ser. No. 17/178,881 filed on Feb. 18, 2021. Application Ser. No. 17/178,881 claims the benefit of U.S. Provisional Application 62/978,400 filed on Feb. 19, 2020. This application claims the benefit of U.S. Provisional Application 63/079,620 filed on Sep. 17, 2020.

FIELD OF THE INVENTION

The present invention relates generally to a steering wheel mounted assembly for providing any of transmission gear, drive mode or vehicle performance metrics. The display portion can include, without limitation, any combination of TFT/OLED or segmented display aspects and is integrated into a housing mounted anywhere within the steering wheel circumference. Either of the display or the overall assembly incorporated into the steering wheel can be constructed according to a number of variants, including a first fully electronic variant in which the images update within the device in response to rotation of the wheel in order to maintain an upright display orientation. A physical variant of the assembly includes a counter weight component for rotating the display in response to steering wheel rotation, again in order to maintain the upright orientation. Another physical variant in which the device including the display is rotated via any of a gear or pulley to maintain the upright wheel orientation.

BACKGROUND OF THE INVENTION

The prior art is documented with interactive user interfaces, such as which can be incorporated into a steering wheel. An example of this is set forth in the interactive user interface for a steering wheel of U.S. Pat. No. 10,780,909 to Aerts et al. The user interface allows navigation of a set of controls associated with a menu provided through the user interface based on the recognized gesture movements.

Another examples is the reconfigurable vehicle user interface system of U.S. Pat. No. 8,406,961 to Pathak et al. and which provides touch sensitive input devices such as touchpads and a touch screen which have specific function commands mapped to them. A user can select which function commands are mapped to which portions of the touch screen, this allowing for a user to customize the steering wheel function commands.

US 2016/0375924 to Bodtker et al. discloses a steering wheel for a vehicle including a steering wheel hub, a first portion of which has an electronic display, with a second portion of the hub having a keyboard in operable communication with the display.

SUMMARY OF THE PRESENT INVENTION

The present invention discloses a steering wheel mounted visual display including a housing incorporated at a location defined within a circumference of the steering wheel, the display having a graphical display output. Upon rotation of the steering wheel, the display adjusts to remain in a continuously upright orientation.

The housing further includes a main lower housing and an assembleable upper housing sandwiching a display component providing the graphical display output. The display component further includes a stationary inner component, a display support and a PCB component cooperating for auto-updating the graphical display output in response to rotation of the steering wheel.

The display component further incorporates a physically and rotationally adjusting inner component in combination with each of a counterweight, a PCB component, a base and a supporting ball bearing component for rotating a continuous graphical display output in response to rotation of the steering wheel. The display component also includes a physically and rotationally adjusting inner component in combination with each of a display support which seats the display component on a forward face, a PCB component located on a reverse face thereof, and a harness connector extending from the display component through the support to the PCB component.

An exteriorly toothed base component is secured over a ball bearing collar shaped component with the use of fasteners. A motor includes a geared output shaft which is in communication with the exterior toothed profile of the base component and operates, in response to inputs from the PCB to the motor, to rotate the base and supported display to maintain the upright orientation.

Other features associated with the visual display include any of thin film display (TFT), transistor LCD, or organic LED (OLED) display variants, which allow for any representation not limited to color, pattern or intensity to be created within a display surface geometry. The display can also include any of transmission gear, drive mode or vehicle performance metrics.

BRIEF DESCRIPTION OF THE DRAWINGS

Reference will now be made to the attached drawings, when read in combination with the following detailed description, wherein like reference numerals refer to like parts throughout the several views, and in which:

FIG. 7 is an assembled perspective view of a fully electronic stationary system according to one embodiment of the present invention;

FIG. 8 is an exploded view of the fully electronic stationary system of FIG. 7;

FIGS. 9-9A and 10-10A provide first and second pairs of illustrations of the steering wheel in each of upright and one hundred and eighty degree rotated positions, with the display component of the device being updated to compensate for the rotated angle of the steering wheel;

FIGS. 11-12 present a pair of partially cutaway views corresponding to FIGS. 9-10 and, with reference to FIG. 12 depicting the images updating to present them upright based on the steering wheel orientation;

FIG. 13 is an assembled perspective view of a counter-weighted system for physically adjusting an orientation of the graphic display;

FIG. 14 is an exploded view of the counter-weighted system of FIG. 13;

FIG. 19 is an assembled perspective view of the motor driven system for reorienting the display in response to rotation of the steering wheel;

FIG. 20 is an exploded view of the motor driven system of FIG. 19/

DETAILED DESCRIPTION OF THE PREFERRED EMBODIMENTS

With reference to the attached illustrations, the present invention discloses a number of variants of a steering wheel mounted assembly for providing any of transmission gear, drive mode or vehicle performance metrics. As will be further described, either of the display or the overall assembly is incorporated into the steering wheel and can be constructed according to a number of variants, including a first fully electronic variant in which the images update within the device in response to rotation of the wheel in order to maintain an upright display orientation. A related physical variant of the assembly includes a counter weight component for rotating the display in response to steering wheel rotation, again in order to maintain the upright orientation. Another physical variant is provided in which the device including the display is rotated via any of a motor actuated gear or pulley in order to maintain the upright wheel orientation.

Prior to a description of the three main variants illustrated herein, the associated display portion in each can include, without limitation, any combination of TFT/OLED or segmented display aspects and is integrated into a housing mounted anywhere within the steering wheel circumference. The present invention further contemplates an improved graphical display for incorporating into a shifter assembly for providing identification of a shifter position. The display can, without limitation, incorporate any of thin film display (TFT), transistor LCD, or organic LED (OLED) display variants and which allows for any representation not limited to color, pattern or intensity to be created within a display surface geometry (again such as not limited to either of a round display in a rotary shifter or a rectangular display associated with a linear gate shifter).

The present invention further allows for the use of a clear display surface (not having any painting or etching associated with known shifter position indications PNRD) and which is only limited by operating software communicated from the associated circuit board and microcontroller. Additional features can include the programmed surface display (such as associated with OLED/TFT variants) depicting a current selected gear shown in enlarged depiction in the center of the graphical display. The PCBA board may further include a main microcontroller with a serial communication protocol not limited to any of LIN, SPI, and I2C. Other features include the PCBA board exhibiting a main microcontroller with a serial communication protocol not limited to any parallel interface established between the main microcontroller and the graphic display.

Figure 1:
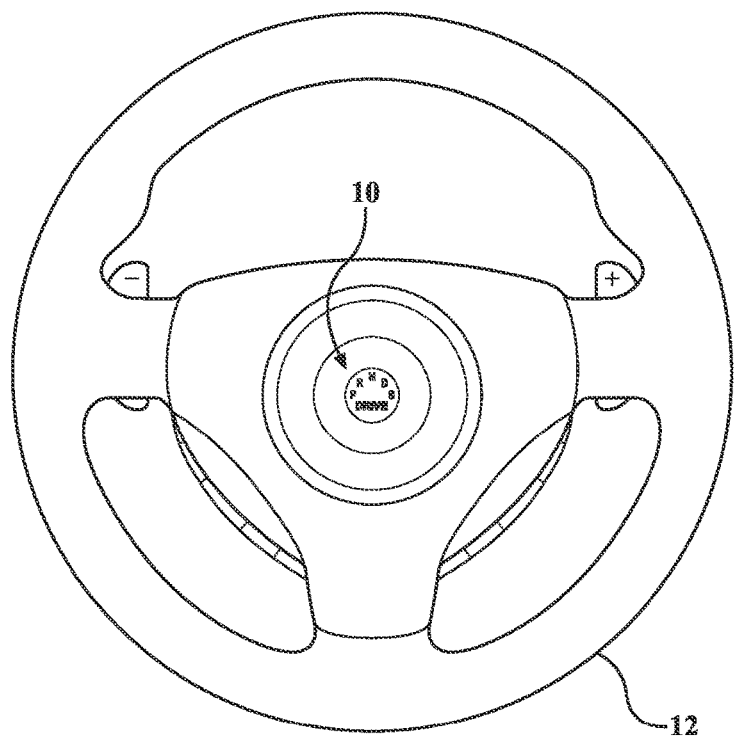
FIG. 1 is a display device incorporated into a vehicle steering wheel, the device being controllable by any of capacitive touch and/or gesture control and being auto-oriented so as to appear upright to the driver regardless of the rotated position of the steering wheel.

Referring now to FIG. 1, a display device is generally shown at 10 incorporated into a vehicle steering wheel 12.

The device, according to any of the variants described herein, is controllable by any of capacitive touch and/or gesture control and is capable of being auto-oriented so as to appear upright to the driver regardless of the rotated position of the steering wheel.

Figure 2:
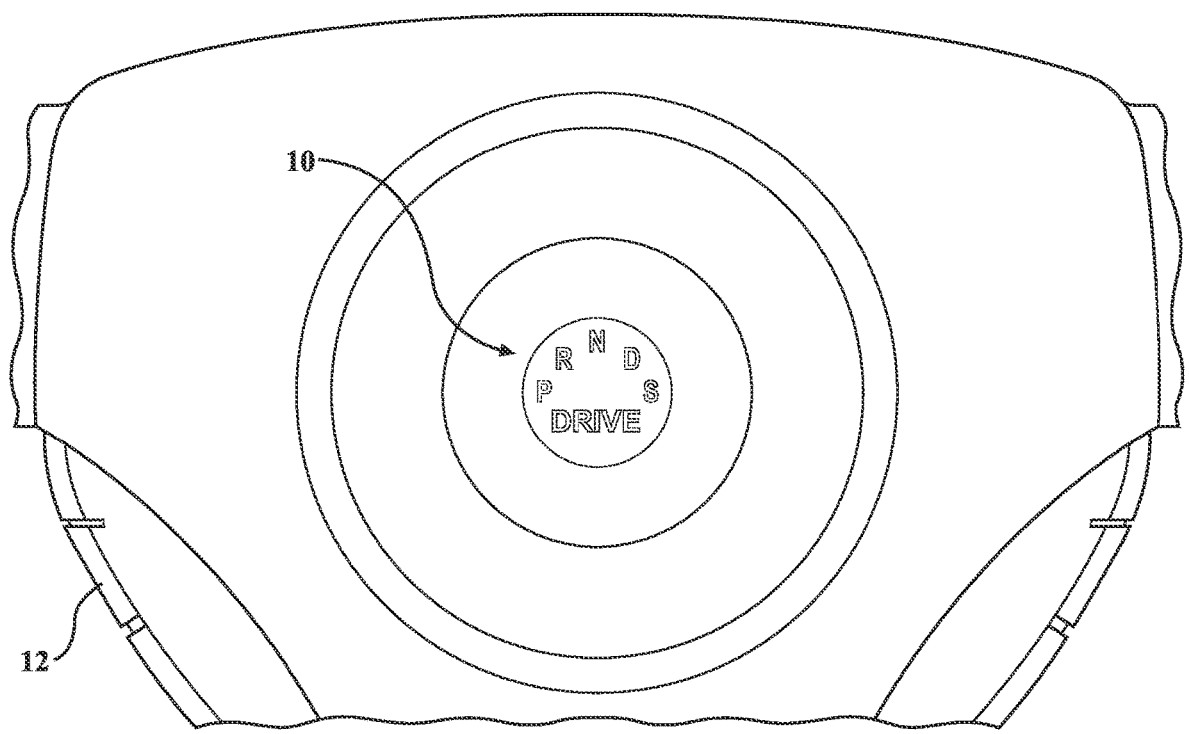
FIG. 2 is an enlarged view of steering wheel mounted device of FIG. 1.
Figure 3:
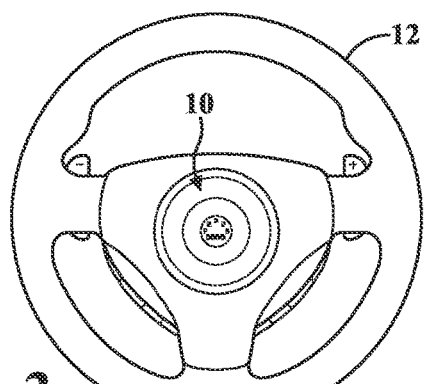
FIGS. 3-3A, 4-4A, 5-5A and 6-6A, each present a series of views of both the overall steering wheel and an enlarged subset view of the mounted display 10 and showing the real time correction of the display image or the physical unit in response to the rotation of the steering wheel.
Figure 3A:
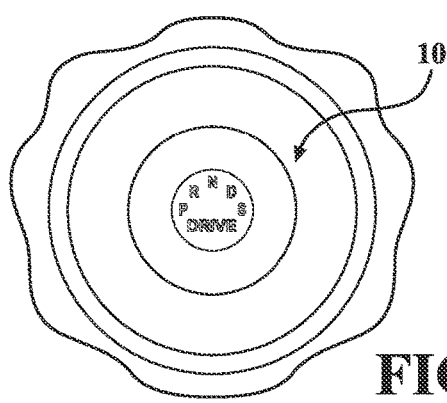
Figure 4:
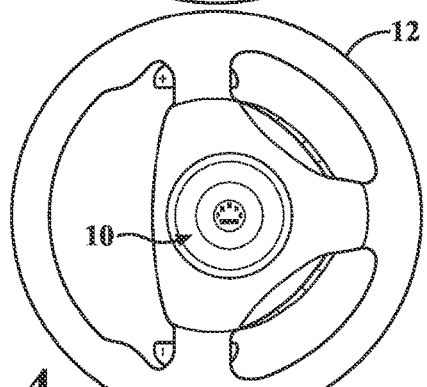
Figure 4A:
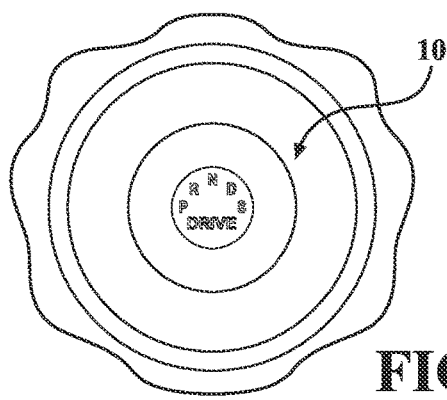
Figure 5:
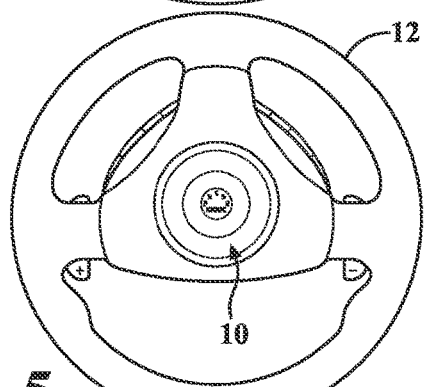
Figure 5A:
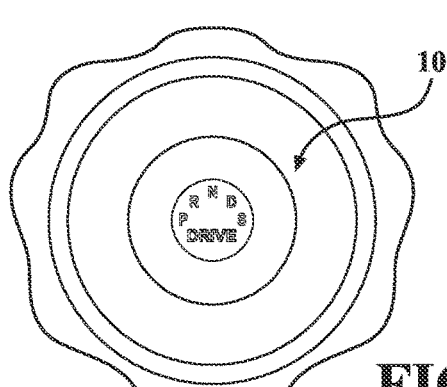
Figure 6:
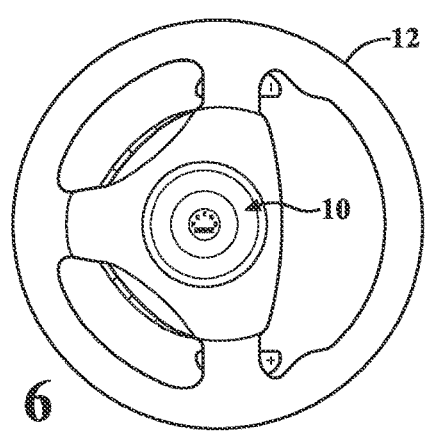
Figure 6A:
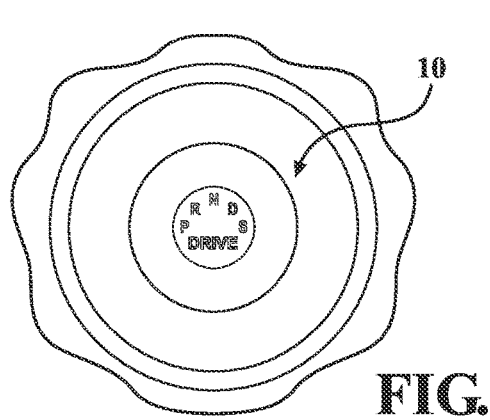
Figure 15:
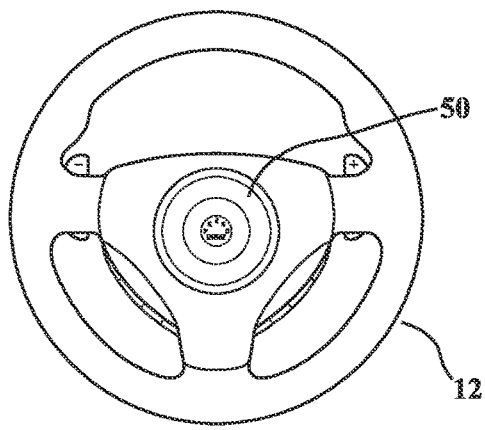
FIGS. 15-15A and 16-16A correspond to FIGS. 9-9A and 10-10A and depict the steering wheel and enlarged display in each of the upright and one hundred and eighty degree rotated positions utilizing the counter-weighted system of FIG. 13.
Figure 16:
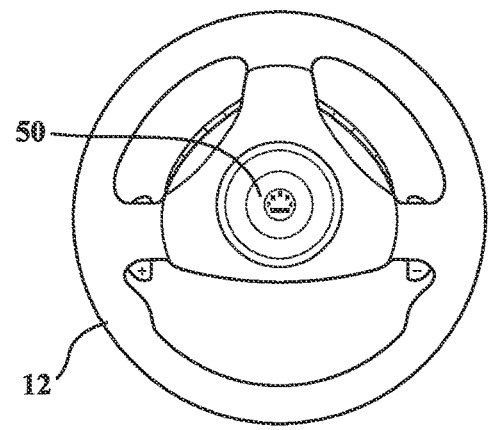
Figure 15A:
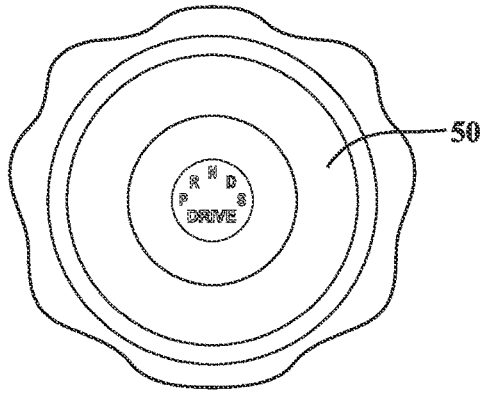
Figure 16A:
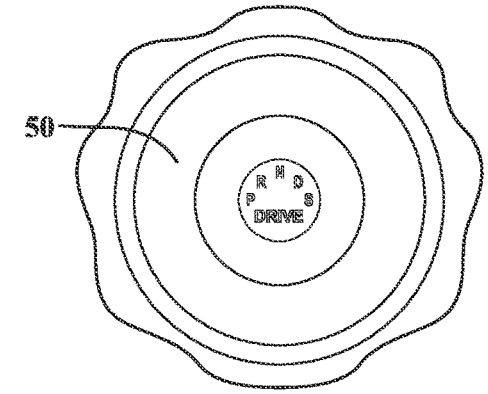

FIG. 2 is an enlarged view of steering wheel mounted device of FIG. 1 and illustrating the self-contained assembly incorporated into a central location of the steering wheel 12. As will be further described, the assembly is capable of being arranged at any location within the steering wheel circumference and can include any arrangement of information not limited to gear shift selection (PRNDM/S), drive modes selector (snow, rain, sport, etc.), and/or four by four, low, etc. Without limitation, the display can also present any other desired vehicle performance metrics (such as oil life status, average MPG, tire pressure, etc.)

The device mounted in the steering wheel again presents information to the driver with the capability to allow the driver to acknowledge or select/change any displayed information. FIGS. 3-3A, 4-4A, 5-5A and 6-6A each present a series of views of the overall steering wheel mounted display 10, with corresponding enlarged subset view of the display, showing the real time correction of the display image (or corresponding rotation of the physical unit) in response to rotation of the steering wheel. This includes through succeeding ninety degree counterclockwise rotations motions as depicted at each of FIGS. 4-6 from the initial steering wheel position of FIG. 3, during which the display image (again FIGS. 3A, 4A, 5A and 6A) is shown retained in an upright orientation.

Proceeding to FIG. 7, an assembled perspective view of a fully electronic stationary system is again depicted at 10 according to one embodiment of the present invention. FIG. 8 is an exploded view of the fully electronic stationary system of FIG. 7 and includes an annular lower housing 14 and an assembleable annular upper housing 16 with an inner perimeter edge 18. A graphic display 20 (such as which can be selected from the options previously described) is positioned underneath the upper housing 18 so that it is visible through the inner perimeter edge 18.

A display support 22 is provided for the graphic display 20, with a printed circuit board assembly (PCBA) 24 supported underneath for communicating with a connector extending from the display, such including without limitation an LCD segmented display ribbon (also termed a harness connector) 25 along with any additional connections so that the overall package is contained within the lower housing 14. Also shown are a pair of fasteners 26 which assemble the package unit together for mounting within the desired location within the circumference of the steering wheel 12.

FIGS. 9-9A and 10-10A provide pairs of illustrations of the steering wheel 12 in each of upright and one hundred and eighty degree rotated positions, respectively with the image presented by the display component of the device 10 being auto-updated in response to compensate for the rotated angle of the steering wheel. In this embodiment, both the lower and upper housings 14/16 and the inner supported graphic display 20, display 22 and PCBA 24 of the assembly are stationary and, in response to rotation of the steering wheel 12, the printed circuit board assembly (PCBA) 24 causes the graphic display 20 to constantly and in real time update presentation of the image so that it always appears upright to the driver. This is further represented in the partially cutaway views of FIGS. 11-12 corresponding to FIGS. 9-9A and 10-10A and, with reference to FIG. 12, depicting the images updating to present them upright based on the steering wheel orientation.

Proceeding to FIG. 13, an assembled perspective view is generally shown at 50 of a counter-weighted system for physically adjusting an orientation of the graphic display according to another non-limiting physical variant of the present invention. In combination with the motor driven variant 100 of FIG. 19, the variants of FIGS. 13 and 19 provide alternate physical versions of the auto-correct mechanism in which, upon rotation of the steering wheel results in physical rotation of the inner components of the respective assemblies (and as compared to the first variant 10 in which the image only is updated to maintain upright orientation).

FIG. 14 is an exploded view of the counter-weighted system of FIG. 13 and includes an annular shaped lower or rear housing 52 and an assemble-able upper or front housing 54, the upper housing having an inner perimeter extending surface 56. The inner components include a graphic display component 58 with an extending connector 59, the display 58 upon assembly being visible between the inner annular edge 56 of the upper housing 54. The graphic display 58 is supported by a disk or wafer shaped counterweight 60. A PCBA board 62 is located against a reverse side of the counterweight 60, with a base 64 is positioned against a rear side of the PCBA 62. A bearing component 66 includes inner annular supported balls 67. Fasteners 68 are provided and secure the PCBA 62, base 64, and counter weight 60 to each other. The base 64 presses into an inner diameter of the bearing component 66 to allow rotation of the inner components (again PCBA 62, base 64, counterweight 60 and display 58), while the outer housing components 52/54 remain stationary.

Figure 17:
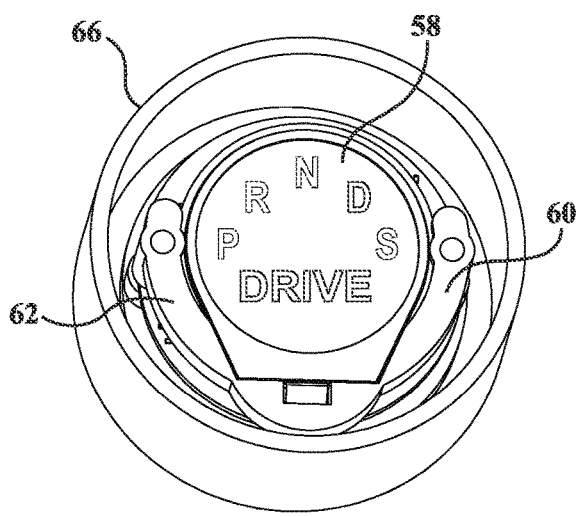
FIGS. 17-18 present a pair of partially cutaway views of the counterweighted assembly and, as best shown in FIG. 18, rotation of the wheel results in the counterweight seeking gravity and rotating the entire device inside of the housing in order to maintain the upright orientation.
Figure 18:
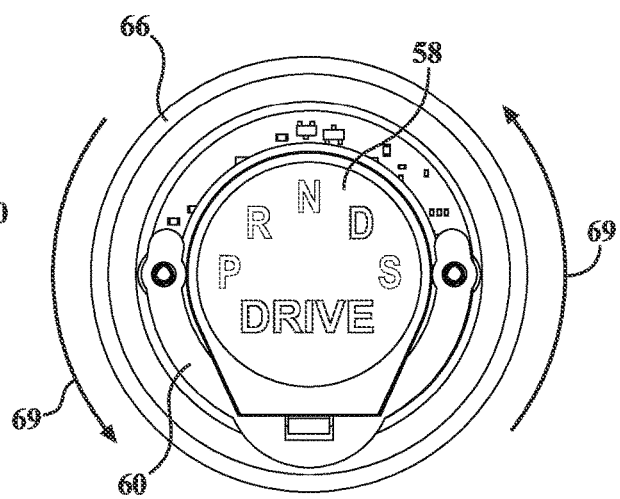
Figure 21:
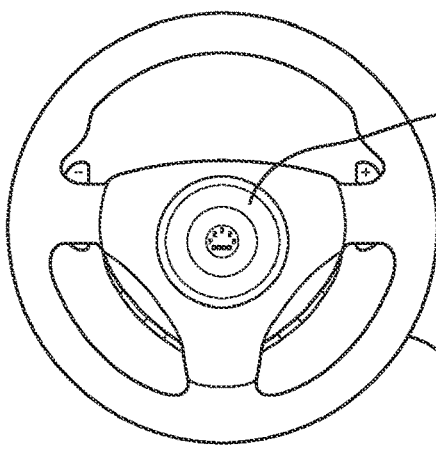
FIGS. 21-21A and FIGS. 22-22A correspond to each of FIGS. 9-9A and 10-10A, as well as FIGS. 15-15A and 16-16A and depict the steering wheel in both the upright and one hundred and eighty degree rotated positions.
Figure 22:
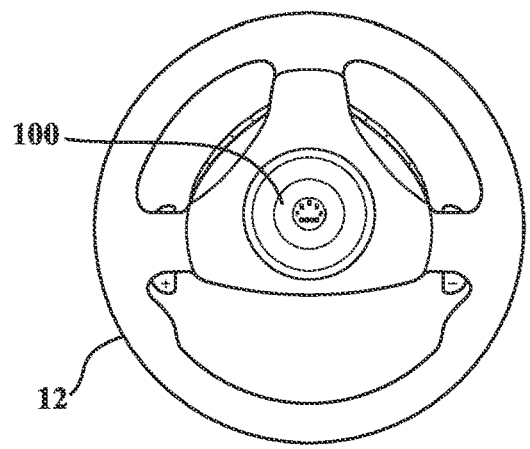
Figure 21A:
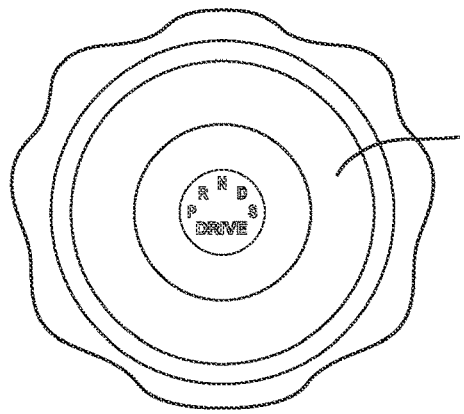
Figure 22A:
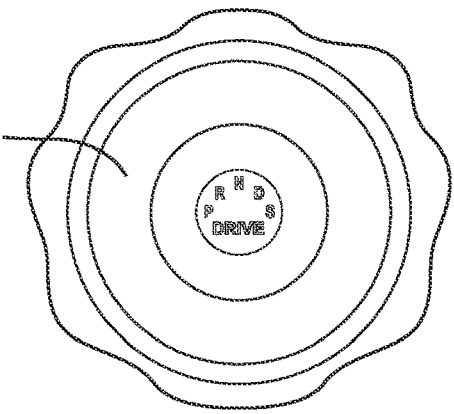

FIGS. 15-15A and 16-16A correspond to FIGS. 9-9A and 10-10A and depict the steering wheel 12 in each of the upright and one hundred and eighty degree rotated positions with the counter-weighted system of FIG. 13. FIGS. 17-18 present a pair of partially cutaway views of the counter-weighted assembly and, as best shown in FIG. 18, with the rotation of the wheel resulting in the counterweight 60 seeking gravity and rotating the entire device (see arrow 69 in FIG. 18) inside of the housing (collectively again including each of the display 58, counterweight 60, PCB 62, base 64, and collar shaped ball bearing component 66, the outer diameter of which is pressed into the inner diameter of the lower housing 52, and remains stationary). The balls 67 within the bearing component 66 and an inner diameter (see at 69 in FIG. 14) of the bearing component 66 are pressed into the rear housing 52 and allow rotation of the inner components during gravity based self-adjustment and in order to maintain the upright orientation in response to rotation of the steering wheel. Upon rotation of the steering wheel, the counterweight 60 responds by seeking gravity correction in order to physically reset the orientation of the display to maintain an upright perspective to the driver/viewer, this again regardless of the steering wheel orientation.

Proceeding to FIG. 19, an assembled perspective view is again shown at 100 of the motor driven system for physically reorienting the display in response to rotation of the steering wheel. FIG. 20 is an exploded view of the motor driven system of FIG. 19 and includes a modified lower housing 102 and assemble-able upper housing 104, this defining an outer casing. The upper housing 104 includes an annular inner perimeter 106 defining a window for viewing a graphic display component 108 contained within the housing.

A display support 110 is depicted which seats the graphic display 108 on a forward face with a PCBA component 112 located on a reverse face thereof. A harness connector 114 is shown which extends from the display 108, through the support 110 to the PCBA 112. Additional components include an exteriorly geared base component 116 which is secured into an inner diameter 117 of a ball bearing component 118 by press fitting (see also annular supported balls 119) by press fitting collar shaped ball bearing component 118. Fasteners 120 are again provided and secure the PCBA 112, gear component 116 and display 108). As previously described in relation to the variant of FIG. 14, an outer diameter of the ball bearing component 118 presses into the rear housing 102, with the inner diameter 117 of the ball bearing component 118 pressing onto the gear component 116 to allow free rotation of the inner parts, while the outer housing remains stationary. A motor 122 includes a geared output shaft 124 which is in communication with the exterior toothed profile 116 and, upon receipt of continuous signals determining a change in the rotational position of the steering wheel, operates in response to inputs from the PCBA 112 to the motor to rotate the base 116 and supported display 108 to maintain the upright orientation.

Figure 23:
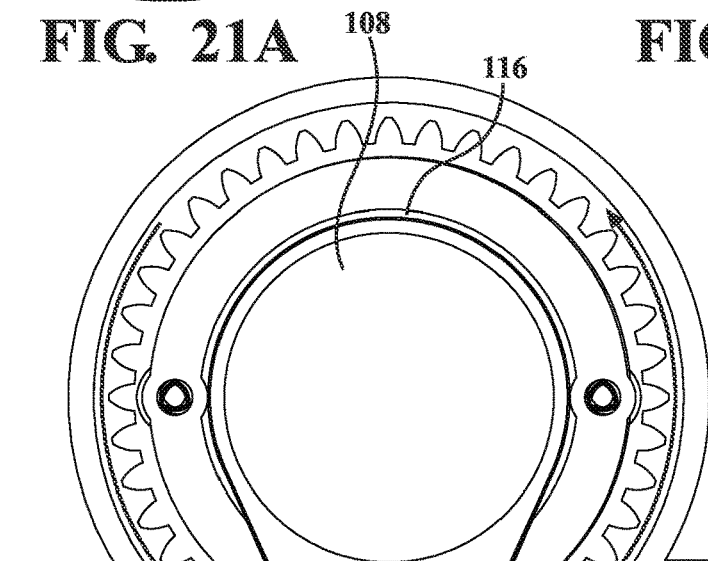
FIG. 23 is a cutaway view of the assembly of FIG. 19 and which, in response to rotation of the steering wheel, rotates the entire mechanism through the actuation of the motor driven mechanism to maintain the display in the upright oriented position.

FIGS. 21-21A and 22-22A correspond to each of FIGS. 9-9A and 10-10A and FIGS. 15-15A and 16-16A and depict the steering wheel in both the upright and one hundred and eighty degree rotated positions. FIG. 23 is a cutaway view of the assembly of FIG. 19 and which, in response to rotation of the steering wheel 12, rotates the entire mechanism through the actuation of the motor driven mechanism to maintain the display in the upright oriented position. In this fashion, the angle of the steering wheel is read by the device which then compensates by rotating the entire mechanism through the actuation of the motor driven mechanism.

Figure 24:
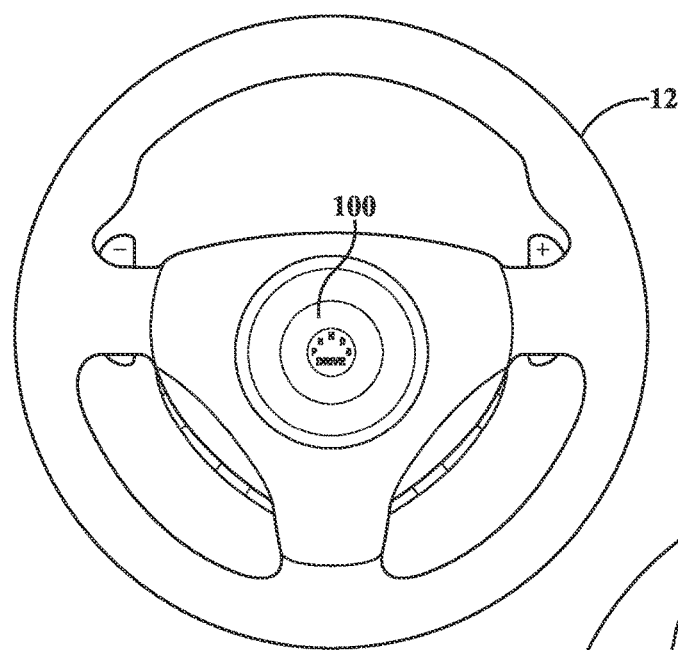
FIGS. 24-26 provide a series of illustrations of a steering wheel with the device mounted at different locations (center, lower, side)
Figure 25:
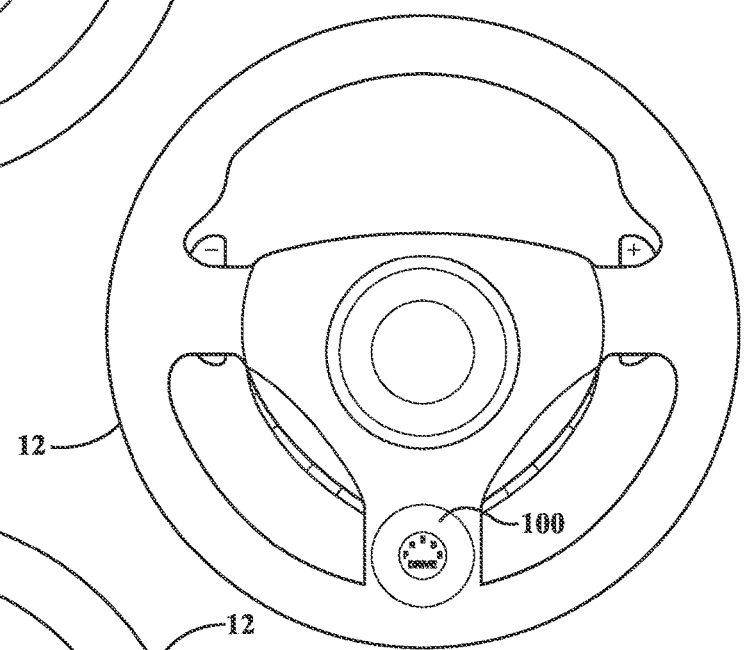
Figure 26:
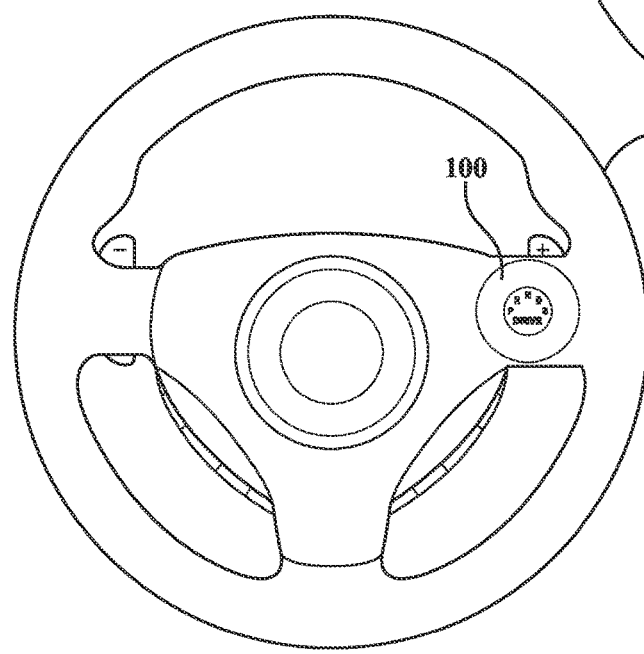
Figure 27:
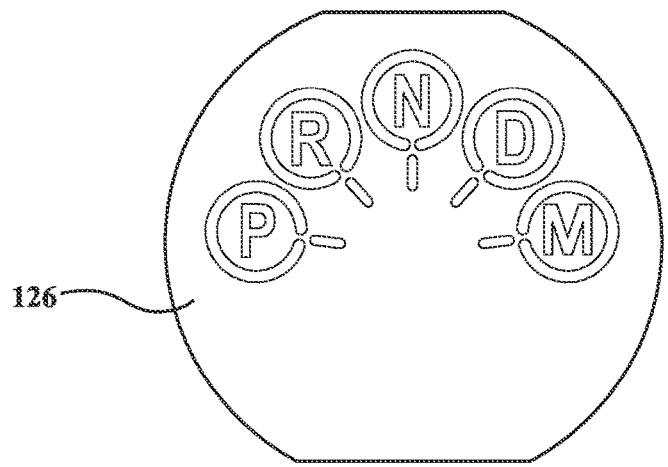
FIG. 27 is a representative illustration of a display in the form of a traditional gear shift selector.
Figure 28A:
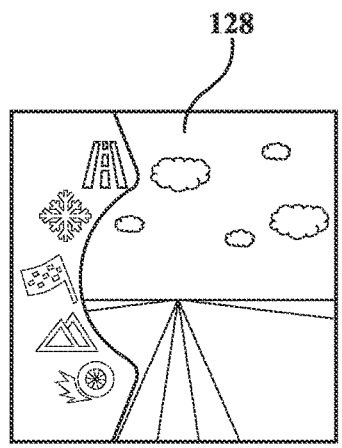
FIGS. 28A-28E provide a series of representative selections of alternate graphical display options incorporated into the display component.
Figure 28B:
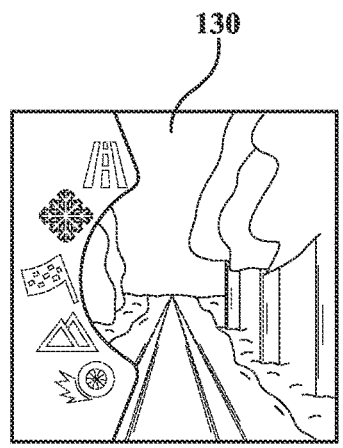
Figure 28C:
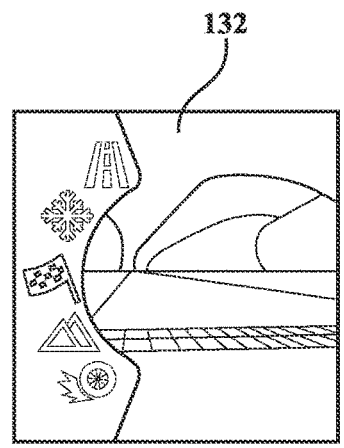
Figure 28D:
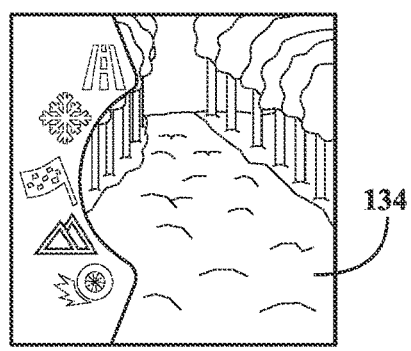
Figure 28E:
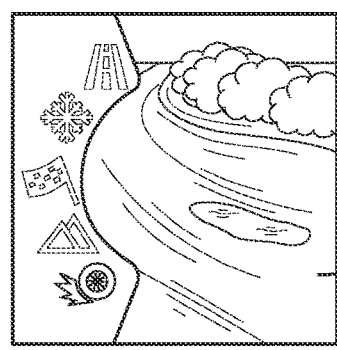

FIGS. 24-26 provide a series of illustrations of the steering wheel 12 with the device 100 mounted at different locations (center, lower, side). FIG. 27 is a representative illustration 126 of a display in the form of a traditional gear shift selector.

FIGS. 28A-28E provide representative selections, respectively at 128, 130, 132, 134 and 136 of alternate graphical display options corresponding to terrain selections incorporated into the display component, and which are intended to be non-limiting. In each instance, any of the color, layout, etc., are fully redefinable. As further shown, the graphical depictions of the terrain selections include for each of road condition (128), snow/ice terrain condition (130), highway terrain condition (132), mountainous/rocky condition (134) and mud/backroad condition (136). Beyond that shown, it is understood and appreciated that the device can serve as any type of information and selection center not limited to gear or terrain selections.

Figure 29:
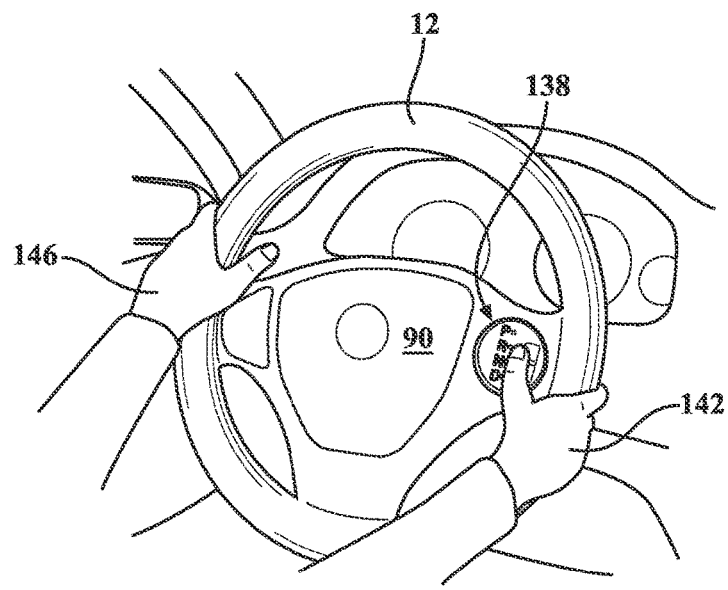
FIG. 29 is an illustration of an alternate mounting arrangement in which the toggle shifter assembly is located upon the steering wheel for ease of access by a user's digit when the hand is supported upon the wheel.
Figure 30:
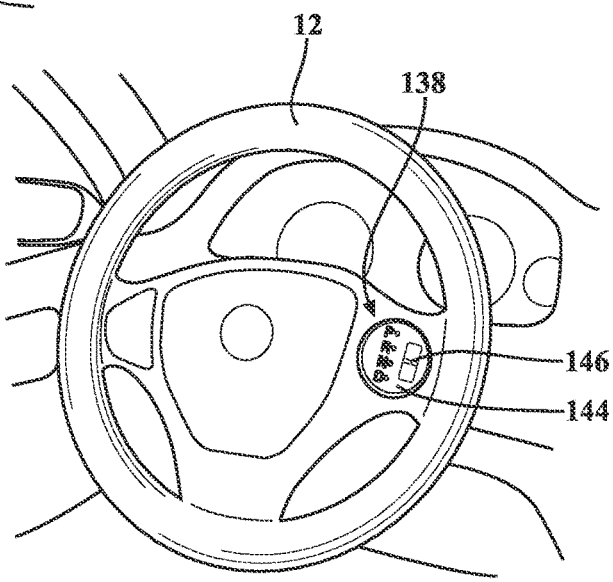
FIG. 30 is a similar illustration to FIG. 29 and with the wheel in a straightened and initial upright orientation.

FIG. 29 is an illustration of an alternate mounting arrangement in which a non-limited variant of shifter assembly is provided (such including any of a toggle style as shown or a scroll wheel type shifter) and which can exhibit a redesigned rotary shaped housing incorporated into a central exposed location of the vehicle steering wheel 12 for ease of access by a user's digit when the user's hands (at 140 and 142) are supported upon the wheel 12. As best shown in FIG. 30, the toggle assembly includes both a display portion 144 and a toggle knob 146 (can also be substituted by a scroll wheel) allowing for concurrent rotation/reorientation in response to rotation of the steering wheel 12, this in order to maintain an upright orientation of the assembly at all times.

Figure 31:
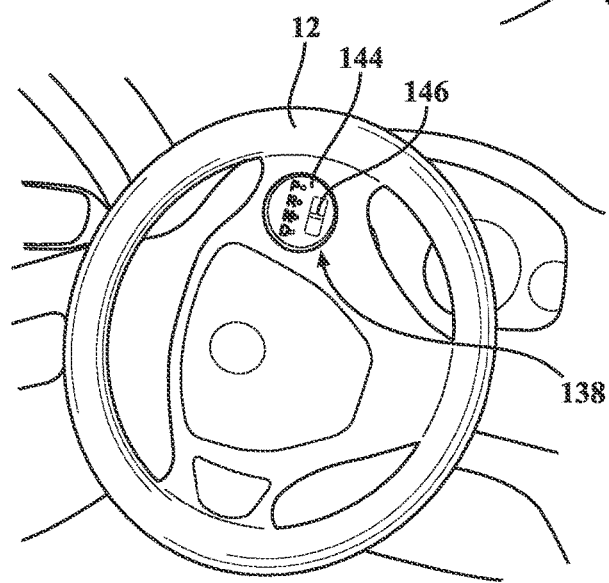
FIG. 31 is a succeeding illustration to FIG. 21 in which the wheel is rotated approximately ninety degrees counter-clockwise, with the toggle shifter being likewise cooperatively rotated within the steering wheel and in order to maintain a continuous upright orientation regardless of the rotational position of the wheel.

FIG. 30 is a similar illustration to FIG. 29 and with the wheel in a straightened and initial upright orientation. FIG. 31 is a succeeding illustration to FIG. 30 in which the wheel 12 and display 100 are rotated approximately ninety degrees in a counter-clockwise direction, with the toggle shifter assembly being likewise cooperatively rotated within the steering wheel 12, again in order to maintain a continuous upright orientation regardless of the rotational position of the wheel.

Figure 32:
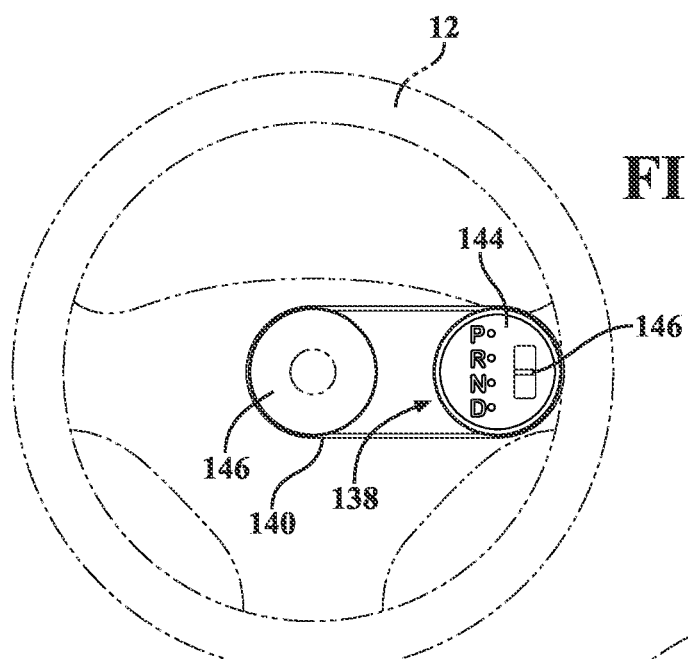
FIG. 32 illustrates a first alternate variant for cooperatively rotating the toggle shifter assembly along with the operator rotation of the steering wheel and which includes a toothed or other frictional engaging drive belt interconnecting the rotary shaped toggle shifter with a central supporting gear incorporated into the steering wheel.

FIG. 32 illustrates a first alternate variant for cooperatively rotating the toggle shifter assembly 138 along with operator rotation of the steering wheel 12, and which includes a toothed or other frictional engaging drive belt 140 interconnecting either of a toothed or frictionally engaging outer circular circumference associated with the rotary shaped toggle shifter assembly 138 and a central supporting gear or like support 146 incorporated into the steering wheel 12. This mechanical embodiment contemplates a number of sub-variants, including the central located gear or support 146 defining a central rotational axis of the steering wheel 12 and which, upon being rotated by the operator, can in turn be rotated in unison to impart a continuous upright orientation to the circular cross sectional shifter assembly 138. This can further envision the steering wheel supported assembly being supported within a bearing ring or like arrangement (not shown) to allow free rotation in response to being acted upon by the drive belt 140.

Figure 33:
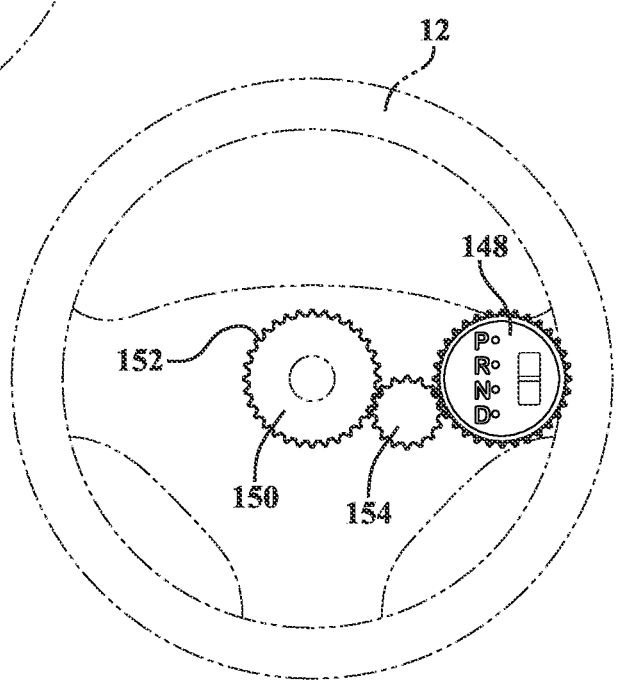
FIG. 33 illustrates a second alternate mechanical variant to FIG. 29 in which a series of interconnected gearwheels are provided for cooperatively rotating the rotary shaped toggle shifter in response to rotation of the steering wheel.

Proceeding to FIG. 33, a second alternate mechanical variant to FIG. 32 is illustrated in which a series of interconnected gearwheels are provided for cooperatively rotating a reconfiguration 148 of the toggle shifter in response to rotation of the steering wheel 12. The central gear or support is reconfigured, as shown at 150, and exhibits a toothed outer profile 152. An intermediate gear 154 is provided and translates the rotation of the central axis defined gear 150 to a toothed exterior of the reconfigured toggle shifter 148 in order to effectuate a similar upright maintaining orientation of the assembly.

Figure 34:
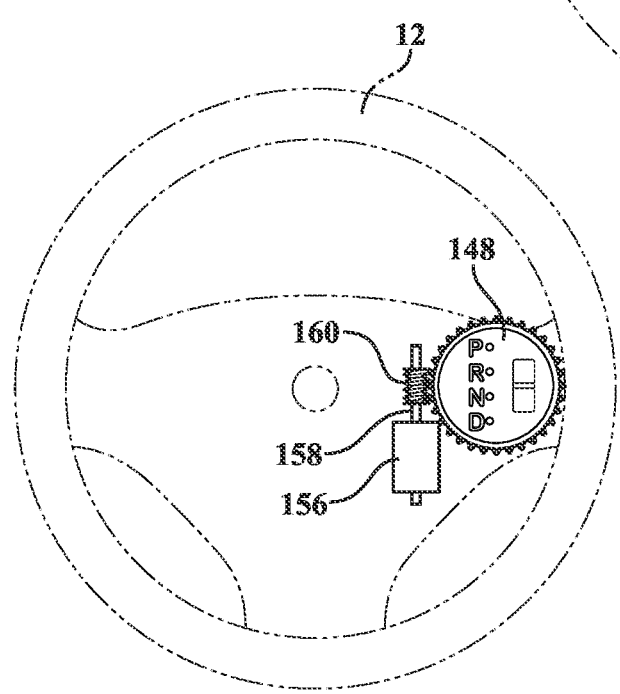
FIG. 34 illustrates a third electrically driven option in which a sensor arrangement is employed for converting rotation of the steering wheel into corresponding rotation of the rotary switching element.

FIG. 34 illustrates a third electrically driven option in which a sensor arrangement is employed for converting rotation of the steering wheel 12 into corresponding actuation and rotation of an electric motor 156 operating as a powered switching element. As shown, an output shaft 158 of the motor incorporates a bevel gear portion 160 which is in turn in contact with the exterior toothed profile of the shifter 148 and, upon actuation of the motor by the separate sensor (not shown) translates the degree of rotation of the steering wheel into real-time rotation of the shifter in order to maintain its upright orientation.

Figure 35:
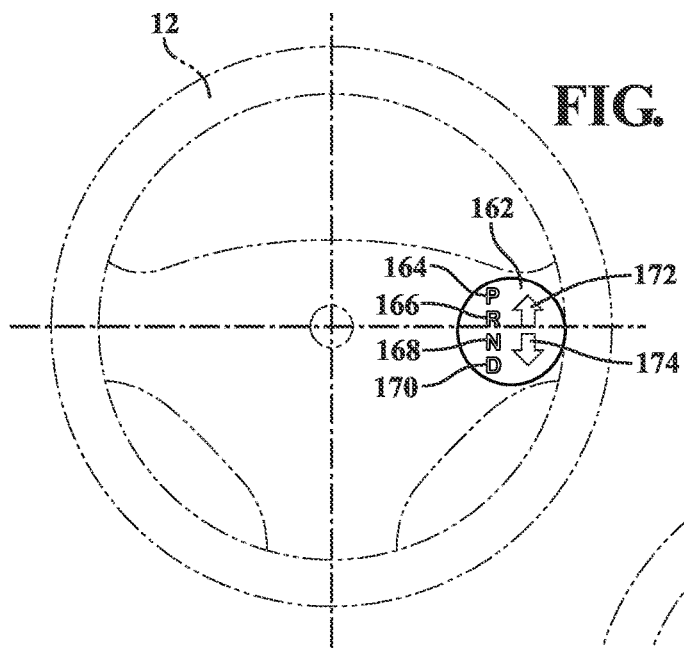
FIG. 35 illustrates a further electronically reorienting variant of a toggle shifter assembly and by which the steering wheel angle is measured with a sensor system for continuously reorienting to an upright viewed position any type of capacitive or other touch screen display positioned upon the steering wheel.

Proceeding to FIG. 35, a further electronically reorienting variant 162 is illustrated of a toggle shifter assembly and by which the steering wheel angle is measured with a similar sensor system (not shown) for continuously reorienting the assembly to an upright viewed position. Without limitation, the assembly 162 incorporates any type of capacitive or other touch screen display including both PRND designations (areas 164, 166, 166 and 170). The toggle element in this specific variant is substituted by an up arrow 172 and down arrow 174 for switching through the gear positions, again through the use of any type of capacitive touch or other touch screen functionality.

Figure 36:
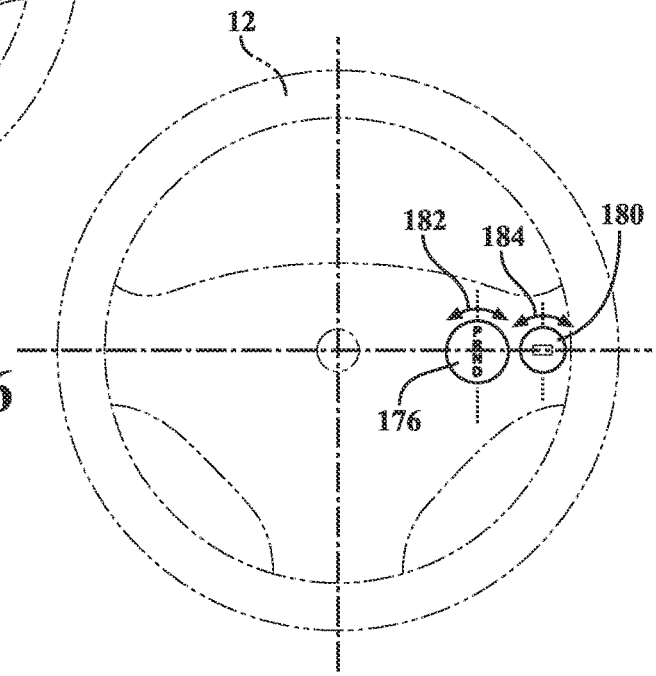
FIG. 36 provides a further variant in which an electronically reorienting display is provided separately along with a separate and likewise reorienting toggle component.

FIG. 36 provides a further variant in which an electronically reorienting display 176 is provided separately along with a likewise rotating/reorienting toggle element 180. The individual elements cooperatively rotate (see arrows 182 and 184) in response to any mechanical or electronic input not limited to those described herein and in order to maintain both the toggle element 180 and communicated display 176 in the upright orientation.

Figure 37:
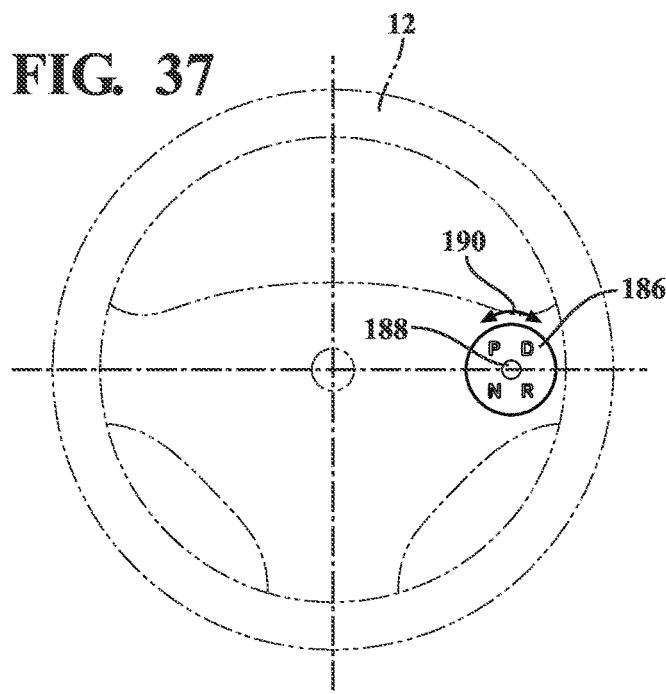
FIG. 37 illustrates a yet further variant of a rotationally adjusting/reorienting display by which a central joystick is incorporated into a redesigned orienting display.

FIG. 37 illustrates a yet further variant of a rotationally adjusting/reorienting display, see at 186, and by which a central joystick or toggle portion 188 is incorporated into a redesigned orienting display. As in previous embodiments, rotation of the steering wheel 12 results in a sensor or other reorienting causing a rotation (see bi-directional arrow 190) of the display in a responsive manner. Subset variants of this configuration can include the central joystick or toggle being either fixed or rotatable along with the concentric outer positioned display portion, with manipulation of the joystick providing for shifting between the positions indicated on the display.

Figure 38:
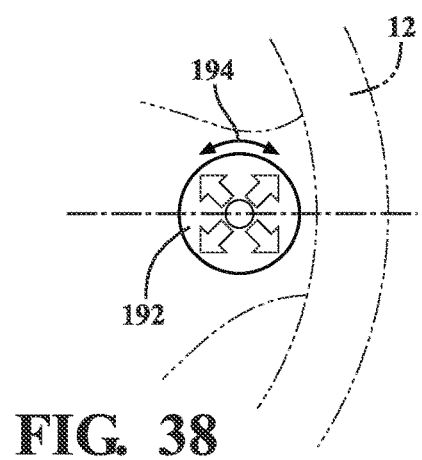
FIG. 38 is a subset variant including an auto-reorienting XY toggle incorporated into a rotatable display.

Finally, FIG. 38 further illustrates a subset variant including an auto-reorienting XY toggle 192 (see as further rotatably actuated bi-directionally by arrow 194). In this instance, a separate display (not shown) can optionally be provided at another location of the vehicle (such as fixed) for providing a readout display of a selected shifter position.

In summation, placing the device and assembly of the present invention within the steering wheel results in a more heads-up display option for reducing the amount of time and amount of head motion a driver must take in order to perform the required shifting/selector operations, this further resulting in safer actions overall.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure.

Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

The invention claimed is:

1. A steering wheel mounted visual display, comprising:
a housing including each of a lower housing and an assembleable upper housing incorporated at a location defined within a circumference of a steering wheel;
a support which seats a graphic display component on a forward face, a PCBA component located on a reverse face of said support, said graphic display component including a graphical display output;
a harness connector extending from said graphic display component through said support to said PCBA component;
an exteriorly toothed gear supported atop a ball bearing component seated within said lower housing, said toothed gear in turn securing said PCBA component, support and graphic display component; and
an auto-correct mechanism integrated into said housing, said auto-correct mechanism further including a motor having a geared output shaft supported within said lower housing so that said output shaft is in communication with said exterior toothed gear and which, upon rotation of the steering wheel, responding to an input from said PCBA component, rotating said gear, support and graphic display component within said housing in order to reorient the graphical display output to remain in an upright orientation.

2. The display of claim 1, said graphic display component further comprising any of a thin film display (TFT), a transistor LCD, or an organic LED (OLED) display.

* * * * *